(12) United States Patent
Mendez

(10) Patent No.: US 11,117,776 B1
(45) Date of Patent: Sep. 14, 2021

(54) DOUBLE-SIDED SQUEEGEE WITH INTERCHANGEABLE SIDES

(71) Applicant: Jay Mendez, Lake Worth, FL (US)

(72) Inventor: Jay Mendez, Lake Worth, FL (US)

( * ) Notice: Subject to any disclaimer, the term of this patent is extended or adjusted under 35 U.S.C. 154(b) by 0 days.

(21) Appl. No.: 16/883,074

(22) Filed: May 26, 2020

(51) Int. Cl.
| | |
|---|---|
| *B65H 37/04* | (2006.01) |
| *B29C 63/02* | (2006.01) |
| *B05C 17/10* | (2006.01) |
| *B29L 31/00* | (2006.01) |
| *B29L 31/30* | (2006.01) |

(52) U.S. Cl.
CPC ............ *B65H 37/04* (2013.01); *B29C 63/02* (2013.01); *B05C 17/10* (2013.01); *B29C 2063/027* (2013.01); *B29L 2031/3055* (2013.01); *B29L 2031/778* (2013.01)

(58) Field of Classification Search
CPC . Y10T 156/18; B29C 2063/027; B29C 63/02; B05C 17/10
USPC ....................................................... 15/236.05
See application file for complete search history.

(56) References Cited

U.S. PATENT DOCUMENTS

2009/0145557 A1* 6/2009 Graham, Sr. ............. B25F 1/00
156/510

* cited by examiner

*Primary Examiner* — Barbara J Musser
(74) *Attorney, Agent, or Firm* — Malloy & Malloy, P.L.; Robert M. Downey

(57) ABSTRACT

A squeegee device for applying a film material to a surface includes a selection of squeegee card components formed of a rubber, rubberized plastic or other rubber-like composition; the selection of squeegee card components being provided in varying degrees of hardness (i.e., durometer) and each squeegee card component including a blade portion with a working edge having a specific length and configuration (e.g., straight, curved, V-shaped) and an attachment portion structured for cooperating interlocked attachment with the attachment portion of another select one of the squeegee card components, with no tools or additional fastening elements required, to provide a double-sided squeegee card with interchangeable card components having two different working edges which may be the same or different length, shape and/or hardness and the same or different durometer.

12 Claims, 7 Drawing Sheets

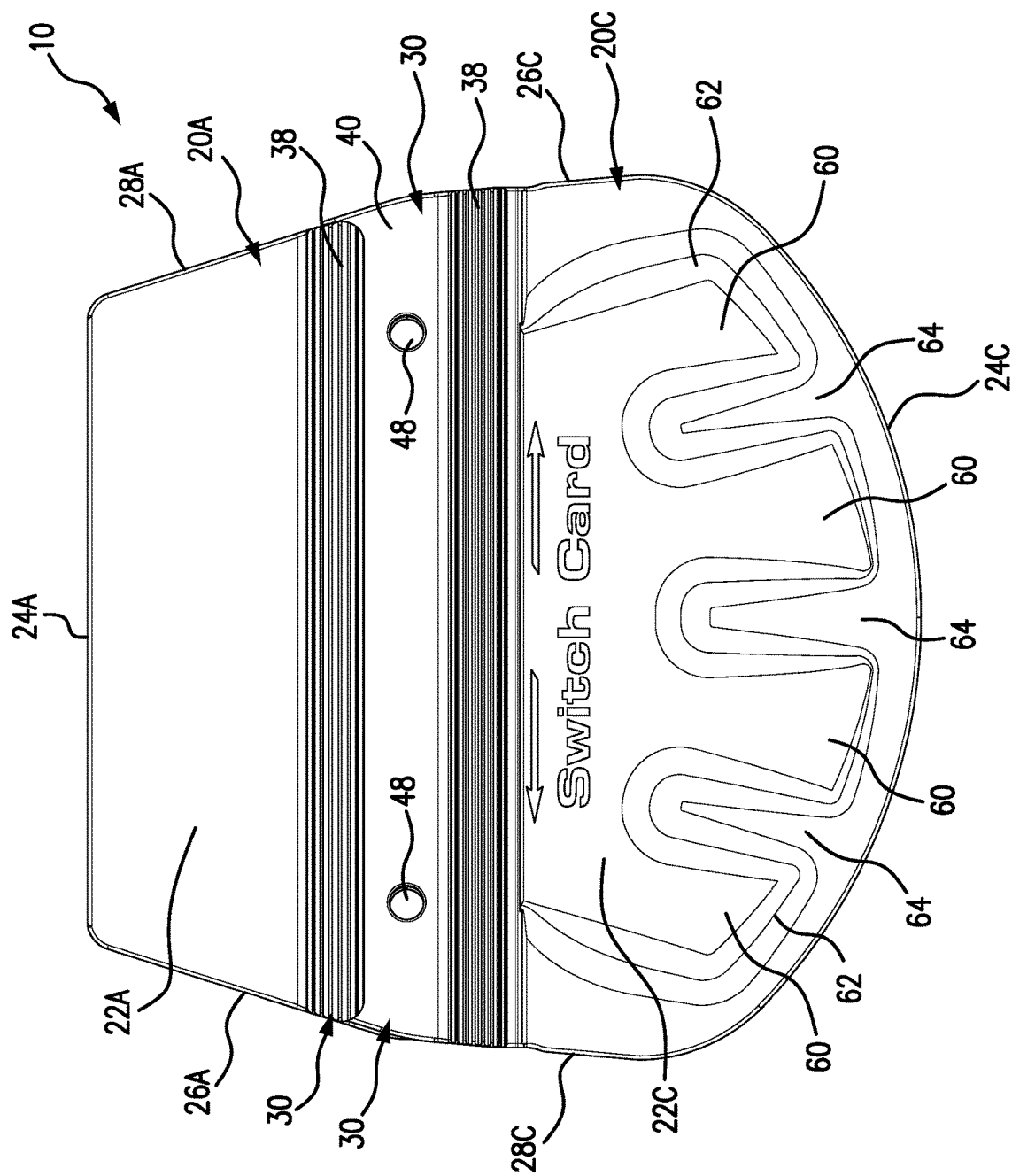

DOUBLE-SIDED SQUEEGEE WITH INTERCHANGEABLE SIDES

BACKGROUND OF THE INVENTION

Field of the Invention

The present invention relates to film applicator tools and, more particularly, to a squeegee device that allows for two separate and interchangeable working edges, each having a select length, shape and hardness (durometer).

Description of the Related Art

Various types of film materials are applied to surfaces to provide a desired appearance or effect that may be ornamental, informative and/or functional. Examples of such film material applications include window tinting (including automobile windows), advertising films, including films and wraps applied to windows and the exterior body of buses and other commercial vehicles, and vehicle body wraps applied over the painted exterior body of automobiles to provide a desired exterior color and/or finish. Applying film materials to the windows and exterior body of automobiles can be particularly challenging due to the varying contours of such surfaces.

The process of applying film materials to surfaces, including automobile window tint film and exterior body wraps, is typically done as a wet application that involves spraying a soapy water solution onto the cleaned application surface and then placing the film on the wet surface. Thereafter, a film applicator tool, often referred to as a squeegee, is used to push air bubbles and the soapy water solution to the edges of the film in order to remove the air bubbles and excess solution from between the film and the underlying surface, while also removing wrinkles and creases so that the film is pressed perfectly smooth against the underlying surface with no blisters, creases or imperfections.

Applying automobile body wraps to the exterior painted surfaces of automobiles can be a tedious process due to the changing surface configurations about the automobile body, including flat surfaces, slightly convex surfaces, rounded surfaces and even concave surfaces, such as around and behind the exterior door handles. Because of the great disparity of surface configurations about the exterior body of an automobile, the application of wraps to these surfaces can require the use of as many as five to eight different squeegee tools of varying size and durometer. Typically, the application of film wraps to larger flat areas is done with a longer and harder working edge, while sharply rounded surfaces requires a squeegee having a shorter and softer working edge that is more flexible. The need to constantly change between different squeegee tools can be frustrating and cause delay in the application process.

Accordingly, there remains an urgent need in the related art for a squeegee tool that provides for two different working edges (i.e., blades) of a select size, shape and durometer, and wherein the different working edges of the squeegee tool can be conveniently interchanged with other working edges of a selected size, shape and durometer as needed by the user.

SUMMARY OF THE INVENTION

The present invention is directed to a film applicator tool and, more particularly, to a squeegee device for applying a film material to a surface, such as window tinting film on building and automobile windows, as well as wraps on the exterior of vehicles, including large commercial vehicles (e.g., city buses) and passenger automobiles. The squeegee device includes a selection of squeegee card components formed of a rubber, rubberized plastic or other rubber-like composition (collectively referred to hereinafter as a "rubber composition") as a one-piece unitary body. The selection of squeegee card components are provided in varying degrees of hardness (i.e., durometer) throughout a range of durometers. Each squeegee card component includes a blade portion with a working edge having a specific configuration (e.g., straight, curved, V-shaped) and an attachment portion that is structured for cooperating interlocked attachment with the attachment portion of another select one of the squeegee card components. The two squeegee card components are attached to one another without the use of tools or any additional fastening elements. When the two selected squeegee card components are attached, they form a double-sided squeegee card with two separate working edges (i.e, blade edges) on opposite sides. The working edge on one side may be the same or a different shape as the working edge on the opposite side. Moreover, the working edge on one side may be straight and be of one specific length (e.g., 4 inches) while the working edge on the opposite side of the double-sided squeegee card may be straight but of a shorter length (e.g., 3 inches). Additionally, the working edge on one squeegee card component may be of one particular durometer, while the working edge on the other squeegee card component that is attached thereto may be of the same or a different durometer, thereby allowing the user to selectively have working edges of varying hardness. For example, one working edge may be more firm and the opposite working edge on the other squeegee card component may be softer and more flexible. Additionally, the working edge on one of the squeegee card components may be of one specific shape while the working edge on the other squeegee card component that is attached thereto may be of a different shape. For example, one working edge may be straight, while the other working edge may be curved or V-shaped.

The attachment portion on each squeegee card component includes a cylindrical wall that surrounds a tubular channel extending from one side of the card to the opposite side of the card with an open gap along the cylindrical wall so that the tubular channel is partially open. The attachment portion further includes a wing extending from the cylindrical wall to a distal edge. The distal edge is formed with an enlarged rail that extends along the entire length of the distal edge from one side edge of the squeegee card component to the opposite side edge of the squeegee card component. The enlarged rail on one squeegee card component is specifically sized, structured and configured for sliding receipt within the tubular channel of the attachment portion of another selected squeegee card component, wherein each squeegee card component incudes a rail fitted within a tubular channel of the other squeegee card component, with the gap in the cylindrical wall permitting passage of the wing of the other card component therethrough. The inner facing surface of the wing of each squeegee card component may be provided with a detent and a bump for cooperating alignment and receipt with a correspondingly positioned detent and bump on the inner facing and opposing wing surface of the other squeegee card component to lock the two squeegee card components together, while indicating to the user that the two squeegee card components are in properly aligned attachment.

The exterior surface of the cylindrical wall of each squeegee card component has a textured surface to provide a grip. More specifically, parallel ridges extending along the length of the exterior surface of the cylindrical wall promote gripping of the double-sided squeegee card, particularly when using the double-sided squeegee card for wet applications of films to surfaces.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a front elevational view of the double-sided squeegee card with interchangeable sides of the present invention, wherein one squeegee card component includes a curved working edge and the other squeegee card component provides a straight working edge, and wherein the durometers of the curved working edge and the straight working edge on opposite sides of the double-sided squeegee card may be of the same or different durometers;

Like reference numerals refer to like parts throughout the several views of the drawings.

DETAILED DESCRIPTION OF THE PREFERRED EMBODIMENT

Figure 1:
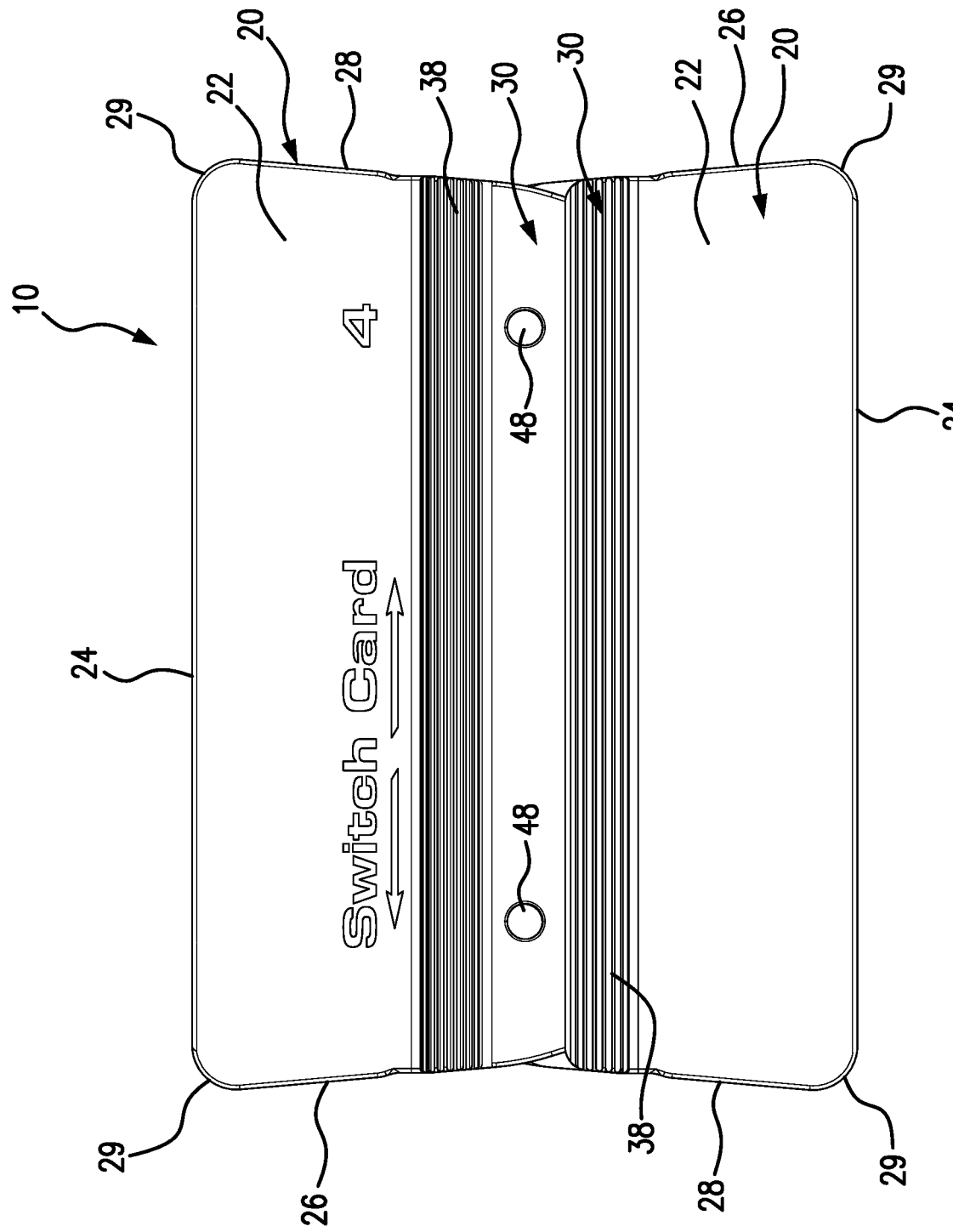
FIG. 1 is a front elevational view of the squeegee device of the present invention providing a double-sided squeegee card with interchangeable sides, and showing two joined squeegee card components to provide opposite working edges having the same length and shape, and which may be of the same or different durometer.
Figure 2:
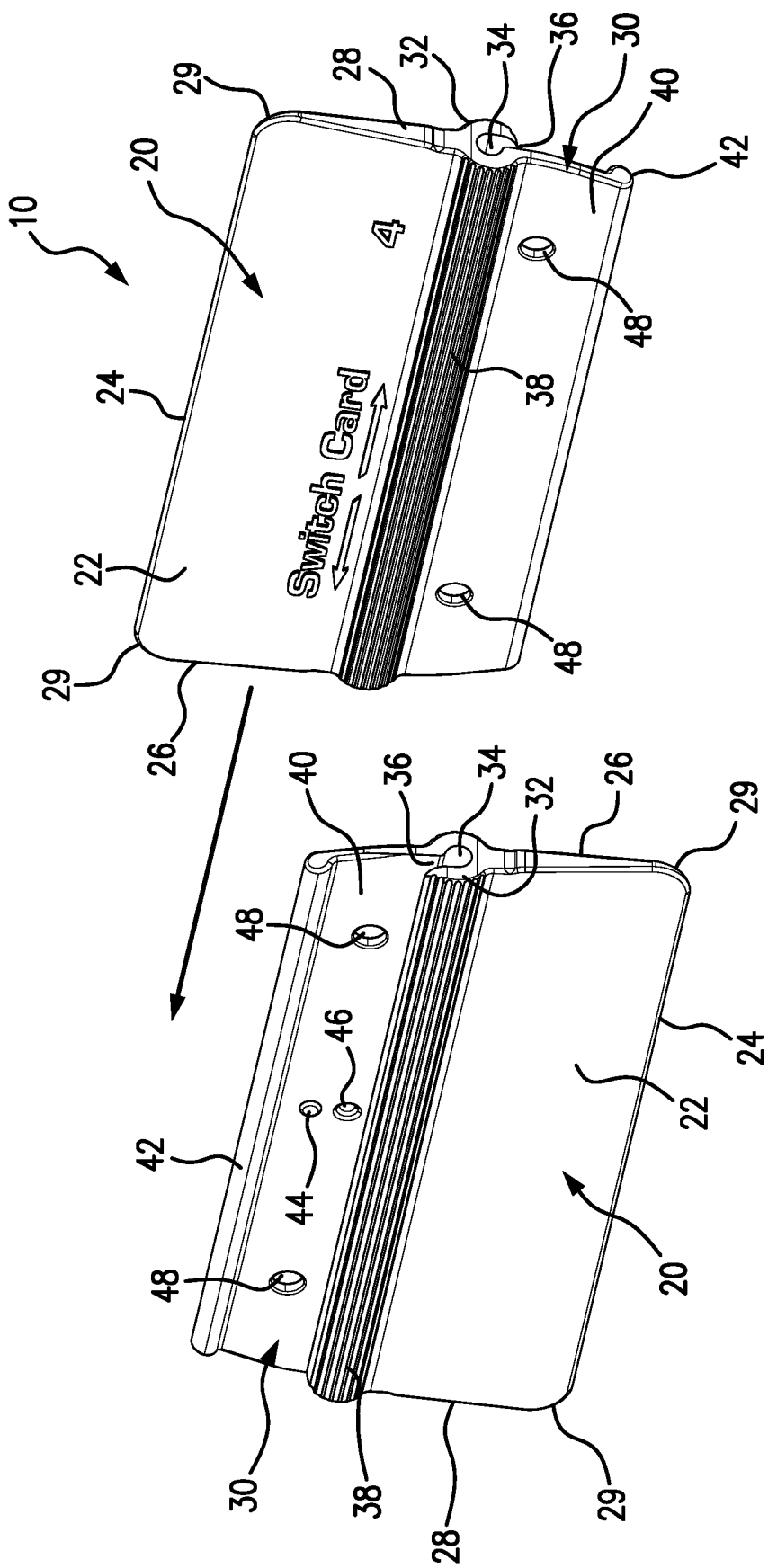
FIG. 2 is an exploded front perspective view of the squeegee device of FIG. 1 and illustrating movement of one squeegee card component relative to another squeegee card component in the process of attaching the two squeegee card components together, as indicated by the arrow, to provide the double-sided squeegee card of the present invention.
Figure 3:
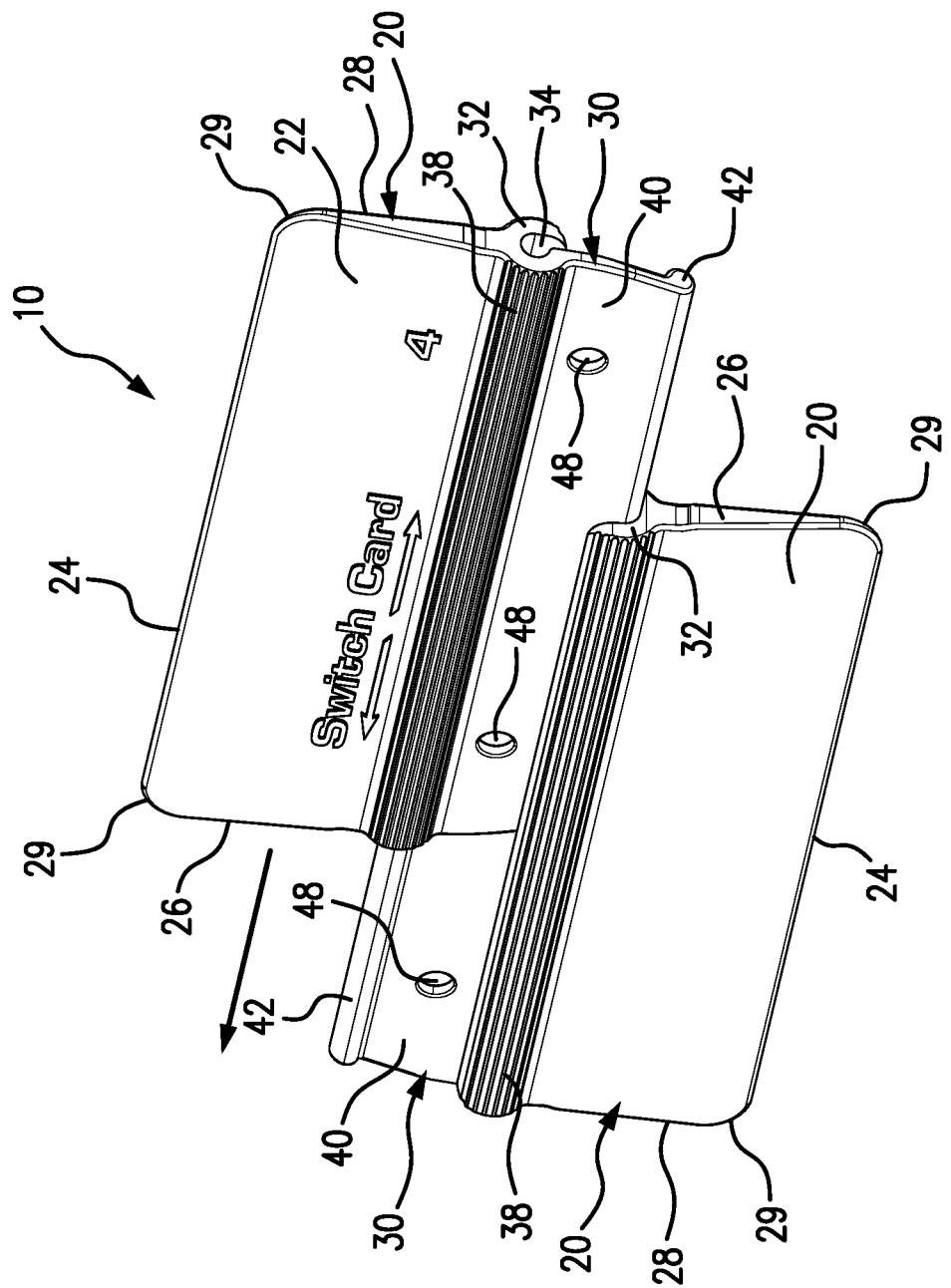
FIG. 3 is a front perspective view of the squeegee device of FIGS. 1 and 2 and showing the further movement of the one squeegee card component relative to the other squeegee card component in the process of attaching the two squeegee card components together, as indicated by the arrow.
Figure 5:
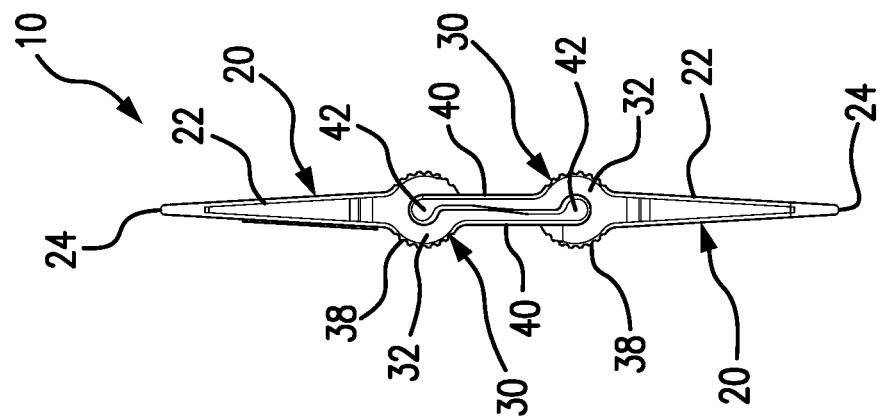
FIG. 5 is an end elevational view showing the attachment of the two squeegee card components.
Figure 7:
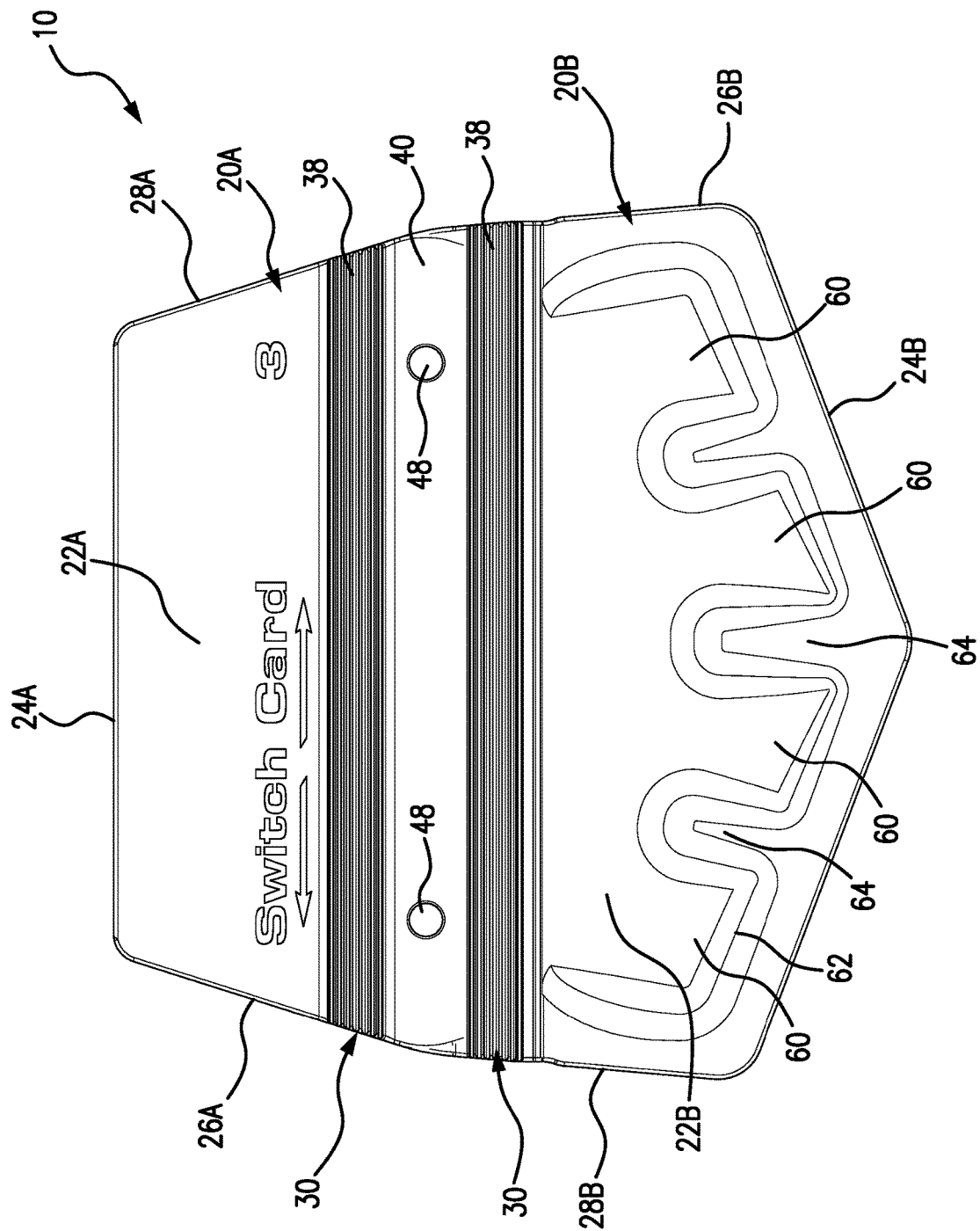
FIG. 7 is a front elevational view showing the double-sided squeegee card with interchangeable sides of the present invention, wherein one squeegee card component has a V-shaped working edge and the other squeegee card component provides a straight working edge on the opposite side of the double-sided squeegee card, and wherein the V-shaped working edge and the straight working edge may be of the same or different durometers.
Figure 8:
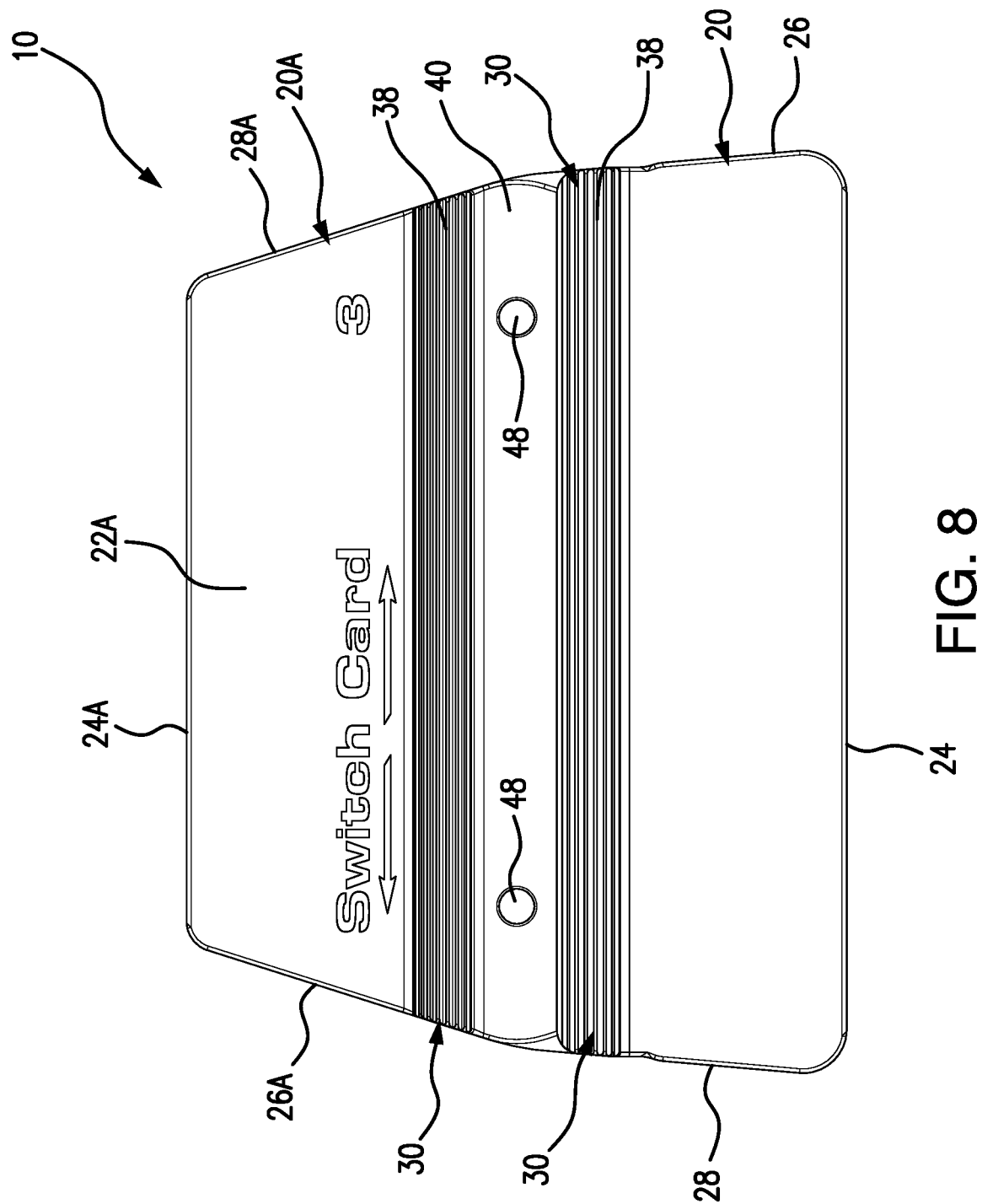
FIG. 8 is a front elevational view showing the double-sided squeegee card with interchangeable sides of the present invention, wherein the working edges on the opposite sides of the double-sided squeegee card are both straight, and wherein the one squeegee card component includes a longer working edge (e.g., 4 inches) while the other squeegee card component has a shorter working edge (e.g., 3 inches), and wherein the working edges of the two squeegee card components may be of the same or a different durometer.

The double-sided squeegee device of the present invention is shown throughout the several views of the drawings and is generally indicated as 10. The squeegee device 10 includes a selection of squeegee card components 20 formed of a rubber composition as a one-piece, unitary body. The selection of squeegee card components 20 are provided in varying degrees of hardness (i.e., durometer) throughout a range of durometers. Each squeegee card component 20 includes a blade portion 22 with a blade edge 24 (referred to hereinafter as the "working edge"). The working edge 24 may be of a variety of different configurations (e.g., straight, curved, V-shaped), as shown throughout the several views of the drawings. As seen in the drawings, the opposite side faces of the blade portion 22 are tapered towards the working edge 24 so that the thinnest part of the blade portion 22 is at the working edge 24. In each of the embodiments, the working edge 24 of the squeegee card component 20 may be any degree of hardness throughout a selected range of durometers, according to the specific material composition and durometer of the squeegee card component 20. Thus, the working edge 24 may be more stiff on one extreme, or very soft and flexible on the other extreme. The squeegee card component 20, including the working edge 24, may be provided throughout a range of durometers of at least eight different degrees of hardness, and possibly as much as twelve to fourteen degrees of hardness (i.e., durometers). As noted above, the working edge 24 may be either straight, curved, V-shaped or other configurations. FIGS. 1-5 illustrate examples wherein both squeegee card components 20 have a straight working edge 24 of the same length (e.g., four inches). Alternatively, as seen in FIGS. 6-8, at least one of the squeegee card components 20 may be provided with a straight edge that is shorter in length (e.g., three inches). As seen in FIGS. 1-3, the squeegee card components 20 that have a straight working edge 24 are further provided with rounded corners 29 to prevent scratching or cutting the film material when using the squeegee device 10 to apply the film material to a surface.

Each of the squeegee card components 20, 20A, 20B and 20C shown throughout the several views of the drawings further includes an attachment portion 30 that is structured for cooperating, sliding and interlocked attachment with the attachment portion of another select one of the squeegee card components 20-20C. The attachment portion 30 on each of the squeegee card components includes a cylindrical wall 32 that surrounds a tubular channel 34 extending from one side edge of the card 26-26C to the opposite side edge of the squeegee card component 28-28C. The tubular channel 34 is open at opposite ends and all the way through its length, with the surrounding cylindrical wall 32 having a consistent cross sectional configuration from one end to the opposite end so that the tubular channel 34 is of uniform dimension from one open end to the opposite open end. The cylindrical wall 32 includes an open gap 36 extending from one side edge 26-26C of the particular squeegee card component 20-20C to the opposite side edge 28-28C of the particular squeegee card component. The open gap 36 communicates with the open tubular channel 34. An exterior surface of the cylindrical wall 32 is textured to provide a grip. As seen throughout the several views of the drawings, one embodiment of the textured surface is an arrangement of parallel ridges that extend from one side edge 26-26C of the particular squeegee card component 20-20C to the opposite side edge 28-28C. The closely spaced parallel ridges providing the textured surface 38 promote ease of gripping of the double-sided squeegee card device 10, particularly when using the double-sided squeegee card device 10 for wet applications of film materials to surfaces.

Figure 4:
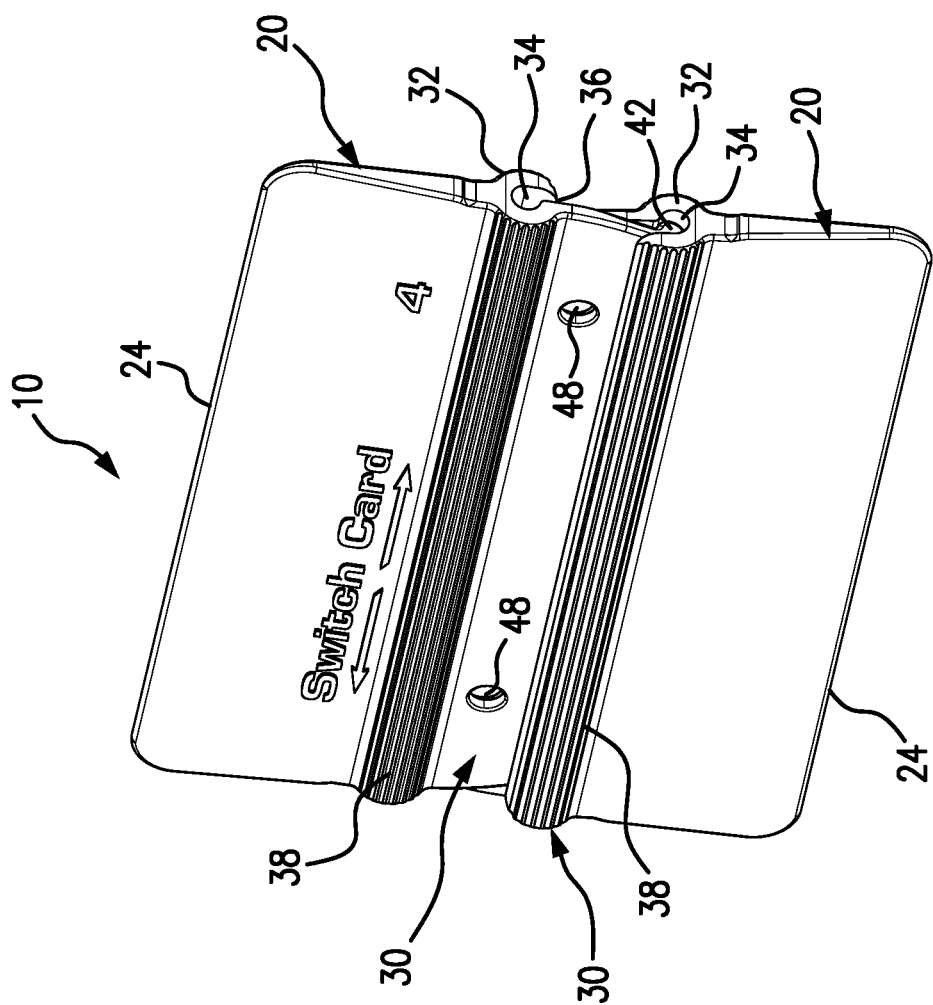
FIG. 4 is a front perspective view of the squeegee device and showing the two squeegee card components of FIGS. 2-3 fully joined in interlocked attachment to one another to provide the double-sided squeegee card having two separate working edges on opposite sides of the double-sided squeegee card, wherein the working edges are of the same length, but may be of the same or different durometer.

The attachment portion 30 on each of the squeegee card components 20-20C further includes a wing that is integrally formed with and extends from the cylindrical wall 32 on one side of the open gap 36. The wing 40 terminates at a distal edge that is provided with an enlarged rail 42. The enlarged rail 42 extends along the entire length of the distal edge of the wing 40, as clearly illustrated in FIG. 2. The enlarged rail 42 on one squeegee card component is specifically sized, structured and configured for sliding and fitted receipt within the tubular channel 34 of the attachment portion 30 of another selected squeegee card component, wherein each squeegee card component includes a rail 42 that is received within the tubular channel 34 of the other squeegee card component, with the open gap 36 in the cylindrical wall 32 permitting passage of the wing 40 of the other squeegee card component therethrough. FIGS. 2-4 illustrate a sequence of attachment of one squeegee card component 20 to another selected squeegee card component 20. Specifically the rail 42 of each squeegee card component is aligned with the open end of the tubular channel 34 of the other squeegee card component and then the one squeegee card component is moved in the direction of the arrow as seen in FIG. 2 until the rail 42 of each squeegee card component is received within the aligned tubular channel 34 of the other squeegee card component. Thereafter, the one squeegee card component 20 is continually moved in the direction of the arrow as shown in FIG. 3 as the rails 42 slide within the corresponding tubular channels 34 until the holes 48 formed through the wing on one squeegee card component are aligned with the holes 48 on the other squeegee card component as seen in FIG. 4. Referring to FIG. 2, the inner facing surface of the wing 40 of each squeegee card component 20-20C is further provided with a bump 44 and a detent 46. When the two squeegee card components are moved into the aligned operative position, as seen in FIG. 4, the bump 44 on one of the squeegee card components is received within the detent 46 on the opposing wing of the other squeegee card component, so that bump 44 on each squeegee card component is received within the correspondingly aligned detent 46, thereby discouraging lateral sliding movement of one squeegee card component relative to the other without applying significant force, while also indicated to the user that the two squeegee card components are interlocked in the properly aligned and operative position.

Referring to FIG. 7, two different squeegee card components 20A and 20B are shown attached to one another to provide two different shaped working edges 24A and 24B, which may be of the same or a different durometer. The squeegee card component 20A has a straight working edge 24A that may be shorter in length compared to the straight working edge 24 on squeegee card component 20, shown in FIGS. 1-5. The straight working edge 24A of squeegee card component 20A may be, for example, three inches in length. The opposite side edges 26A and 28A are slanted or converged towards one another moving from the attachment portion 30 to the working edge 24A, as clearly seen in FIGS. 6-8. In FIG. 7, the squeegee card component 20A is shown attached to another squeegee card component 20B having a V-shaped working edge 24B. Squeegee card component 24B has opposite side edges 26B and 28B. Additionally, the blade portion 22B of squeegee card component 20B is provided with fingers 60 having an increased thickness relative to the working edge 24B. The fingers 60 taper in thickness along areas as indicated by the lines 62 until they reach a minimum thickness at web areas 64 between the fingers 60 and on the opposite outboard sides of the fingers 60. The fingers 60 provide strength to the blade portion 22B, while the webbed areas 64 between the fingers 60 provide increased flexibility of the blade portion 22B when using the squeegee card component 20B, and particularly when applying pressure of the working edge 24B against a surface upon which a film material is being applied.

FIG. 6 shows yet another squeegee card component 20C attached to squeegee card component 20A. Squeegee card component 20C includes a curved working edge 24C extending from one side edge 26C to the opposite side edge 28C. Similar to the structure of the squeegee card component 20B in FIG. 7, the squeegee card component 20C in FIG. 6 includes fingers 60 on the blade portion 22C with webbed areas 64 between the fingers and a decreasing thickness of material surrounding the fingers 62. Similar to the squeegee card component 20B as described in FIG. 7, the fingers 60 on squeegee card component 20C and web areas 64 provide for flexibility of the working edge 24C, while maintaining strength and rigidity of the blade portion 22C. This particular working edge 24C, having a curved configuration, is particularly useful when applying film materials to tight concave surfaces, such as the dish-shaped surfaces surrounding exterior door handles on an automobile. More particularly, the squeegee card component 20C with the curved working edge 24C is particularly useful to apply wraps to the exterior surface of automobiles within tight concave surface areas, such as the areas surrounding the exterior door handles.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A squeegee device for applying a film material to a surface comprising:
   a plurality of squeegee card components each formed of a rubber composition as a one-piece unitary body, and the rubber composition having a durometer selected from a range of durometers;
   each of said plurality of squeegee card components including a blade portion with a working edge having a select one of a plurality of working edge configurations;
   each of said plurality of squeegee card components further including an attachment portion that is structured for cooperating attachment with the attachment portion of another select one of the plurality of squeegee card components, wherein the two squeegee card components are attached to one another without the use of tools or any separate fastening elements; and
   wherein the two squeegee card components are attached to one another to form a double-sided squeegee card with the working edges of the two squeegee card components being separate from one another.

2. The squeegee device as recited in claim 1 wherein the attachment portion on each of the plurality of squeegee card components includes an open tubular channel and an elongate rail spaced from the open tubular channel, and the elongate rail of any select one of the plurality of squeegee card components being sized, structured and configured for sliding, fitted receipt within the open tubular channel of another select one of the plurality of squeegee card components to effectively attach the two selected squeegee card components together to form the double-sided squeegee card.

3. The squeegee device as recited in claim 2 wherein each of the plurality of squeegee card components further includes a textured surface on at least a portion of the squeegee card component for promoting gripping of the double-sided squeegee card.

4. The squeegee device as recited in claim 3 wherein the configuration of the working edge of at least one of the plurality of squeegee card components is straight.

5. The squeegee device as recited in claim 4 wherein the configuration of the working edge of at least one of the plurality of squeegee card components is curved.

6. The squeegee device as recited in claim 4 wherein the configuration of the working edge of at least one of the plurality of squeegee card components is V-shaped.

7. A squeegee device for applying a film material to a surface comprising:
   a plurality of squeegee card components each formed of a rubber composition as a one-piece unitary body, and the rubber composition having a durometer selected from a range of durometers;
   each of said plurality of squeegee card components including a blade portion with a working edge;
   each of said plurality of squeegee card components further including an attachment portion that is structured for cooperating attachment with the attachment portion of another select one of the plurality of squeegee card components, wherein the two squeegee card components are attached to one another without the use of tools or any separate fastening elements; and
   wherein the two squeegee card components are attached to one another to form a double-sided squeegee card with the working edges of the two squeegee card components being separate from one another.

8. The squeegee device as recited in claim 7 wherein the attachment portion on each of the plurality of squeegee card components includes an open tubular channel and an elongate rail spaced from the open tubular channel, and the elongate rail of any select one of the plurality of squeegee card components being sized, structured and configured for sliding, fitted receipt within the open tubular channel of another select one of the plurality of squeegee card components to effectively attach the two selected squeegee card components together to form the double-sided squeegee card.

9. The squeegee device as recited in claim 8 wherein each of the plurality of squeegee card components further includes a textured surface on at least a portion of the squeegee card component for promoting gripping of the double-sided squeegee card.

10. The squeegee device as recited in claim 9 wherein the working edge of at least one of the plurality of squeegee card components is straight.

11. The squeegee device as recited in claim 9 wherein the working edge of at least one of the plurality of squeegee card components is curved.

12. The squeegee device as recited in claim 9 wherein the working edge of at least one of the plurality of squeegee card components is V-shaped.

* * * * *